(12) United States Patent
You

(10) Patent No.: US 10,582,033 B2
(45) Date of Patent: Mar. 3, 2020

(54) METHOD OF PROVIDING INFORMATION AND MOBILE TELECOMMUNICATION TERMINAL THEREOF

(75) Inventor: Yong Ho You, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1497 days.

(21) Appl. No.: 13/331,122

(22) Filed: Dec. 20, 2011

(65) Prior Publication Data

US 2012/0316873 A1    Dec. 13, 2012

(30) Foreign Application Priority Data

Jun. 9, 2011    (KR) .................. 10-2011-0055555

(51) Int. Cl.
*G10L 15/26*    (2006.01)
*H04M 1/725*    (2006.01)

(52) U.S. Cl.
CPC ............................ *H04M 1/72522* (2013.01)

(58) Field of Classification Search
CPC ....... G10L 15/22; G10L 15/26; G10L 15/265; G10L 17/005; H04M 2250/74; H04M 3/4931; H04M 2201/40
USPC ..................... 704/235, 246, 275; 455/415
See application file for complete search history.

(56) References Cited

U.S. PATENT DOCUMENTS

| 2002/0093923 | A1* | 7/2002 | Bouet ..................... H04L 29/06 370/328 |
| 2003/0110503 | A1* | 6/2003 | Perkes ............... H04N 7/17318 725/86 |
| 2003/0195974 | A1* | 10/2003 | Ronning ................... G06F 8/65 709/230 |
| 2004/0015353 | A1* | 1/2004 | Kim et al. ..................... 704/246 |
| 2007/0165805 | A1* | 7/2007 | Altberg et al. ........... 379/114.13 |
| 2008/0154612 | A1* | 6/2008 | Evermann et al. ........... 704/275 |
| 2009/0089393 | A1* | 4/2009 | Yi ......................... H04L 67/104 709/211 |
| 2009/0104934 | A1* | 4/2009 | Jeong ................. H04N 1/00132 455/556.1 |
| 2009/0240497 | A1* | 9/2009 | Usher et al. .................. 704/235 |
| 2010/0105364 | A1 | 4/2010 | Yang |
| 2011/0022387 | A1* | 1/2011 | Hager .......................... 704/235 |
| 2011/0035220 | A1* | 2/2011 | Opaluch ...................... 704/246 |
| 2011/0061016 | A1* | 3/2011 | Song .................... H04L 63/107 715/779 |

(Continued)

FOREIGN PATENT DOCUMENTS

| KR | 10-2007-0031117 A | 3/2007 |
| KR | 10-0866043 B1 | 10/2008 |
| KR | 10-2010-0047719 A | 5/2010 |

*Primary Examiner* — Richemond Dorvil
*Assistant Examiner* — Mark Villena
(74) *Attorney, Agent, or Firm* — Jefferson IP Law, LLP

(57) ABSTRACT

A method of providing information of a mobile communication terminal, and a mobile communication terminal for performing the method, are provided. The method includes determining whether a search command event has been generated during a call with a counterpart terminal, converting a voice signal received from a microphone into a text when the generation of search command event is determined to have been generated, identifying information matching the text in a memory, and sending the information to the counterpart terminal.

17 Claims, 3 Drawing Sheets

(56) References Cited

U.S. PATENT DOCUMENTS

2011/0117897 A1\* 5/2011 Lee .................... H04M 1/575
                                            455/414.3
2011/0320548 A1\* 12/2011 Jonsson .................... 709/206
2012/0108221 A1\*  5/2012 Thomas et al. ............. 455/415
2012/0278728 A1\* 11/2012 Malin .............. H04N 21/47202
                                            715/748

\* cited by examiner

METHOD OF PROVIDING INFORMATION AND MOBILE TELECOMMUNICATION TERMINAL THEREOF

PRIORITY

This application claims the benefit under 35 U.S.C. § 119(a) of a Korean patent application filed on Jun. 9, 2011 in the Korean Intellectual Property Office and assigned Serial No. 10-2011-0055555, the entire disclosure of which is hereby incorporated by reference.

BACKGROUND OF THE INVENTION

1. Field of the Invention

The present invention relates to a method of providing information and a mobile communication terminal thereof. More particularly, the present invention relates to a method of providing information during a call and a mobile communication terminal thereof.

2. Description of the Related Art

The mobile communication terminal market is growing rapidly due to various designs and applications. As compared to existing mobile phones that have limited functionality, a smart phone is able to download various applications from an online market.

When a 'video call' button is pressed during a voice communication, the call is immediately converted to the video call. The voice communication does not need to be stopped to start a video call. This is possible through a communication service called Rich Communication Suite enhanced (RCSe). RCSe provides a service which can simultaneously send and receive a file such as a message, a photograph, music, and a moving picture while talking over the telephone. For example, a user may press a 'file sending' button during the call for execution of the RCSe. The RCSe does not need to download a separate application and may be implemented in a general mobile phone. However, the existing RCSe cannot provide speech recognition technology, such as Text To Speech TTS technology or Speech To Text STT technology.

SUMMARY OF THE INVENTION

Aspects of the present invention are to address at least the above-mentioned problems and/or disadvantages and to provide at least the advantages described below. Accordingly, an aspect of the present invention is to provide a method for guiding a data communication state and various information stored in a memory to user and the other party who is busy during a call by using a speech recognition technology, and a mobile communication terminal thereof.

In accordance with an aspect of the present invention, a method of providing information of a mobile communication terminal is provided. The method includes determining whether a search command event has been generated during a call with a counterpart terminal, converting a voice signal received from a microphone into text when the search command event is determined to have been generated, identifying information matching the text in a memory, and sending the information to the counterpart terminal.

In accordance with another aspect of the present invention, a mobile communication terminal is provided. The terminal includes a wireless communication unit for performing audio and data communication, a voice codec unit for converting an analog voice signal received from a microphone into a digital voice signal, a voice-text conversion unit for converting the digital voice signal received from the voice codec unit into text, and a controller for identifying information matching the text received from the voice-text conversion unit in a memory, and for controlling the wireless communication unit to send the information to a counterpart terminal, when a search command event is generated during a call with the counterpart terminal.

According to the method of providing information of the present invention and a mobile communication terminal thereof, the mobile communication terminal can guide a data communication state and various information stored in a memory to user and the other party who is busy during a call Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
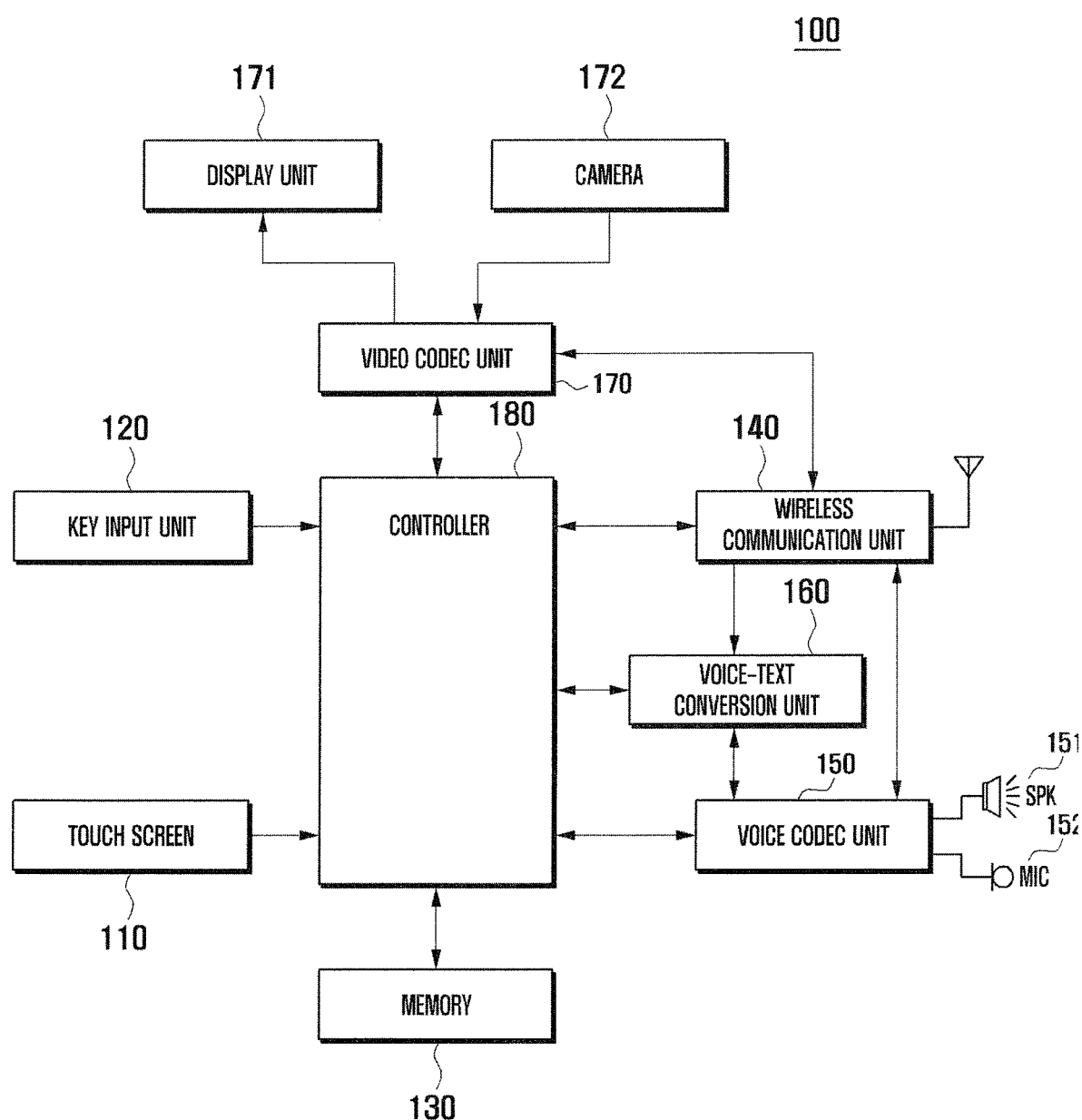
FIG. 1 is a block diagram illustrating a configuration of a mobile communication terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, the Rich Communication Suite enhanced (RCSe) technology takes advantage of a specialized service of voice communication environment. The status of a file transfer is indicated using a Text To Speech (TTS) technology. When the user transfers a file via a file sending service during a call, the mobile communication terminal identifies a sending state or a sending completion time of the file transfer to the user by voice. The user does not need to separately manipulate the terminal to determine the sending state.

In addition, information is searched using a Speech To Text (STT) technology. When the user uses a voice search service during a call, the mobile communication terminal recognizes the user's voice and identifies information that the user wants, such as a document, a phone book, an image, a moving picture, and music in memory and sends the information to the other party terminal. For example, when the other party requests phonebook information of a third party to user during a call with the user, the user activates an information search by voice. The user terminal recognizes the voice command, identifies the desired information, and sends the information to the other party terminal in a message. The mobile communication terminal may be as a mobile phone, a smart phone, a Code Division Multiple Access (CDMA) terminal, a Global System for Mobile communication (GSM) terminal, a High Speed Downlink Packet Access (HSDPA) terminal, and a Long Term Evolution terminal (LTE), and applications thereof. Hereinafter, it is assumed that the mobile communication terminal is a smart phone.

FIG. 1 is a block diagram illustrating a configuration of a mobile communication terminal according to an exemplary embodiment of the present invention.

Referring to FIG. 1, the mobile communication terminal 100 according to an exemplary embodiment of the present invention may include a touch screen 110, a key input unit 120, a memory 130, a wireless communication unit 140, a voice codec unit 150, a speaker 151, a microphone 152, a voice-text conversion unit 160, a video codec unit 170, a display unit 171, a camera 172, and a controller 180. The mobile communication terminal 100 may also include additional units. Similarly, the functionality of two or more of the above units may be integrated into a single component.

The touch screen 110 sends a touch event to the controller 180. This touch event can be classified into a touch and drop (Touch&Drop), a drag and drop (Drag&Drop) and a flick and drop (Flick&Drop). The touch and drop denotes an operation in which the user withdraws a finger from a spot after pressing the spot. Drag and drop denotes an operation in which the user withdraws a finger from a spot after moving the finger in a certain direction. Flick and drop denotes an operation in which the user withdraws a finger from a spot after rapidly moving the finger. The controller 180 may classify the flick and the drag according to the transition speed. The touch and drop may be classified into a tap and a press according to the touch time. A tap denotes a touch operation in which the user withdraws a finger after touching the touchscreen 110 for a short time, while the press denotes a touch operation in which the user withdraws a finger after touching the touchscreen 110 for a relatively long time.

The touch event may be classified into a call request event, a search command event, and a call termination event according to the meaning. The touch event may be variously classified according to a location, a direction, a distance, and a pressure. The touch screen 110 may be a resistive type, a capacitive type, and/or a pressure type.

The key input unit 120 includes a plurality of keys for the manipulation of the terminal 100, and sends a key event to the controller 180. The key event may be a search command event, a power on/off event, a volume control event, or a screen on/off event. The key input unit 120 of includes a side key disposed at a side of the mobile communication terminal 100 and generates a search command event.

The memory 130 stores programs and data used for the operation of the mobile communication terminal 100, and may store an operating system, an application, and a data such as an image, an audio, and a video. The memory 130 includes a main storage unit and a secondary storage unit. The secondary storage unit may be flash memory and the main storage unit may be Random Access Memory (RAM). The main storage unit is a space in which the operating system and the application are loaded. When the mobile communication terminal 100 is booted, the operating system is executed while being loaded from the secondary storage unit to the main storage unit. The application is executed while being loaded from the secondary storage unit to the main storage unit. When the application is terminated, the application is deleted from the main storage unit.

The secondary storage unit is a space which stores the Operating System (OS), various applications, and various data. The secondary storage unit can be classified into a program area and a data area. The program area stores an application executing an information providing method according to an exemplary embodiment of the present invention. The data area stores a search command, a phone book, an image, music, a moving picture, and other data. The wireless communication unit 140 performs the transmitting and receiving of signals relating to a voice communication, a video call, a Short Message Service (SMS) or a Multimedia Message Service (MMS) and a data communication.

The wireless communication unit 140 converts a digital signal, e.g., a voice signal received from the voice codec unit 150, a video signal received from the video codec unit 170 and data received from the controller 180 into an analog signal, i.e., a wireless signal, and transmits the wireless signal to a receiving side. The wireless communication unit 140 converts received wireless signals into a voice signal, a video signal and data, outputs the converted voice signal to the voice codec unit 150, outputs the converted video signal to the video codec unit 170, and outputs the converted data to the controller 180.

The wireless communication unit 140 includes a wireless frequency transmission unit which up-converts and amplifies the frequency of the wireless signal for sending, a wireless frequency reception unit which low-noise amplifies the received wireless signal and down-converts the frequency of the wireless signal, and a modem unit which modulates a digital signal to/from an analog signal. The voice codec unit 150 converts the voice signal into the digital signal and vice versa. When a call is performed, the voice codec unit 150 converts the digital voice signal received from the wireless communication unit 140 into the analog voice signal and outputs the converted signal to the speaker 151, and converts the analog voice signal received from the microphone 152 into the digital voice signal and outputs the converted signal to the wireless communication unit 140.

When a record event is generated, the voice codec unit 150 converts the analog voice signal received from the microphone 152 into the digital voice signal and sends the converted signal to the controller 180. When a play event is generated, the voice codec unit 150 converts the voice signal received from the controller 180 and outputs the converted signal to the speaker 151. When the search command event is generated during a call, the voice codec unit 150 converts the analog voice signal received from the microphone 152 into the digital voice signal and sends the converted signal to the voice-text conversion unit 160. The voice codec unit 150 converts the voice signal received from the voice-text conversion unit 160 and outputs the converted signal to the speaker 151.

The voice-text conversion unit 160 performed the TTS and the STT. The voice-text conversion unit 160 converts the digital voice signal received from the voice codec unit 150 and the wireless communication unit 140 into text and sends the converted signal to the controller 180. The voice-text conversion unit 160 also converts the text received from the controller 180 into the digital voice signal and outputs the converted signal to the voice codec unit 150. The video codec unit 170 converts the video signal into the digital signal and vice versa. The video codec unit 170 converts a digital image signal received from the controller 180, e.g., a home screen, an application execution screen, and a video file into the analog image signal, and outputs the converted signal to the display unit 171. The video codec unit 170 converts the analog image signal received from the camera 172 into the digital image signal and sends the converted signal to the controller 180. When a video call is performed, the video codec unit 170 converts the digital image signal received from the wireless communication unit 140 into the analog image signal and outputs the converted signal to the speaker 151, and converts the analog image signal received from the camera 172 into the digital image signal and outputs the converted signal to the wireless communication unit 140.

The display unit 171 displays the analog image signal received from the video codec unit 170. The display unit 171 divides a screen into a pointer area, a main area, and a sub area under the control of the controller 180. The display unit 171 displays time, battery level, and reception in the pointer area, and displays a main screen and a sub screen respectively in the other two areas. The main screen may be a lock screen, a home screen, and an application execution screen. The lock screen is an image which is displayed when the screen of the display unit 171 is turned on. The home screen is an image including a plurality of icons for the execution of the application. The sub-screen may be an image that includes an icon of a currently executing application or set according to user preference. The sub-screen may include a menu for the change of the main screen.

The camera 172 photographs an image and outputs the photograph image to the controller 180 or the wireless communication unit 140. The camera 172 may include a front camera arranged in the front of the terminal and a rear camera arranged in the rear of the terminal.

The controller 180 controls overall operations of the mobile communication terminal 100 and a signal flow between the internal blocks of the mobile communication terminal 100. When the controller 180 detects an unlocking event, e.g., a drag and drop in the direction from the left to the right, the controller 180 converts the image displayed on screen from the lock screen to the home screen or the application execution screen. When the controller 180 detects a touch event for one application icon, e.g., a tap, the controller 180 executes a corresponding application, and converts the image displayed on screen from the home screen to the application execution screen. For example, when the user taps the icon for the video call, the controller 180 controls the display unit 171 to display a call execution screen in the main screen area. The controller 180 performs the function of providing information, e.g., a phone book or a file sending state, during the call. The operation of the controller 180 is described below with reference to FIGS. 2 and 3.

Figure 2:
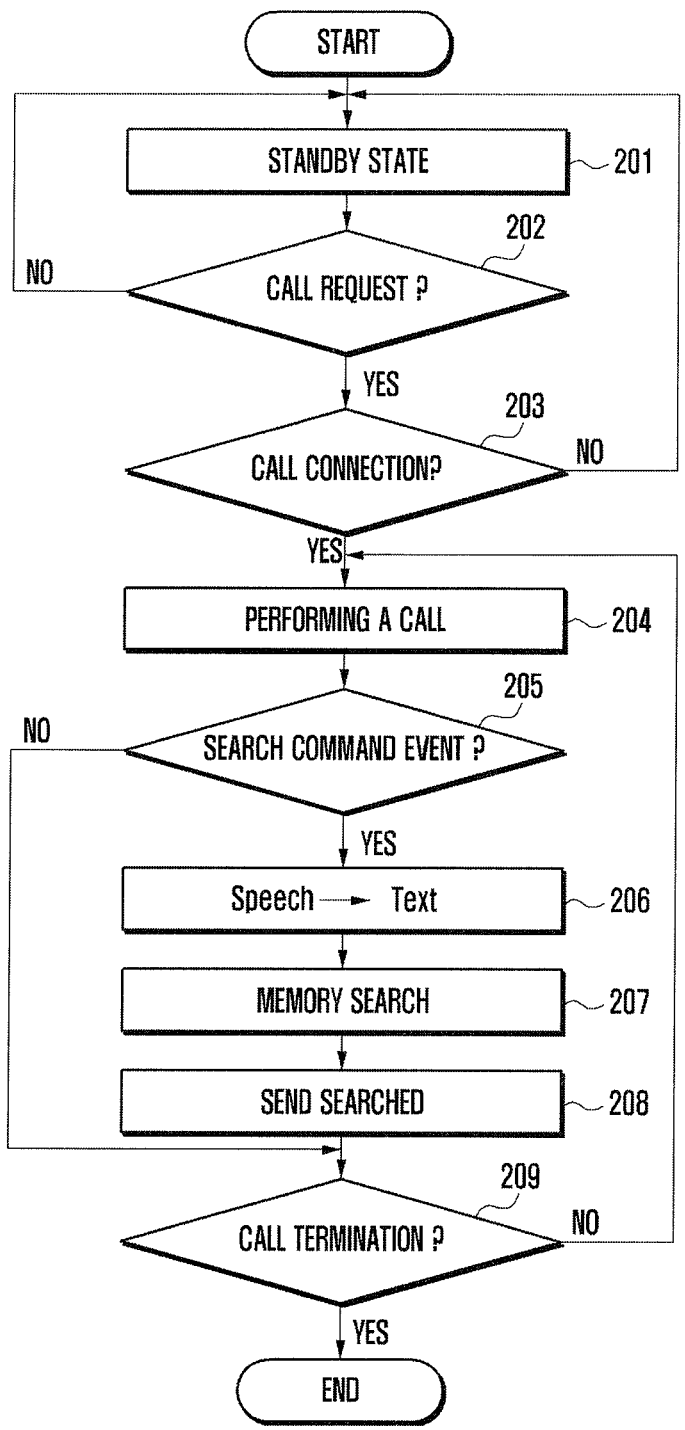
FIG. 2 is a flowchart illustrating a method of providing information according to an exemplary embodiment of the present invention.

FIG. 2 is a flowchart illustrating a method of providing information according to an exemplary embodiment of the present invention.

Referring to FIG. 2, the controller 180 is in the standby state in step 201. The controller 180 determines whether the call request event is generated in step 202. When the call request event is detected, the controller 180 determines whether a call connection with the other party terminal succeeds in step 203. When the call connection succeeds, the controller 180 controls the wireless communication unit 140, the voice codec unit 150, the speaker 151, and the microphone 152, and performs a call in step 204. The controller 180 determines whether a search command event is generated in step 205. When the controller 180 detects the search command event, the controller 180 proceeds to step 206. When the controller 180 does not detect the search command event, the controller 180 proceeds to step 209. The search command event may be an event generated via the key input unit 120 or the touch screen 110.

The controller 180 receives a user input event from the key input unit 120 and the touch screen 110. The controller 180 determines whether the user input event is a search command event. If the user input event is the search command event, the controller 180 controls the voice codec unit 150 and the speaker 151 to output an answer sound. The answer sound may be a beep sound, or a voice such as "please, input a search word". The controller 180 controls the voice-text conversion unit 160.

The search command event may be a specific voice of the user or the other party. Accordingly, when the call is performed, the voice-text conversion unit 160 converts the voice signal received through the wireless communication unit 140 and the voice codec unit 150 from the microphone 152 into text and sends the text to the controller 180. The controller 180 determines whether a command is the previously stored search command. If the command is the search command, the controller 180 controls the voice codec unit 150 and the speaker 151 to output the answer sound. The controller 180 may perform the procedure of storing the search command in the memory 130 before the call process.

In the standby state, the controller 180 receives the user input event from the key input unit 120 and the touch screen 110. The controller 180 determines whether the user input event is a search command setting event. When the user input event is the search command setting event, the controller 180 controls the voice-text conversion unit 160 to convert the received voice signal, e.g., "address search" into text. The controller 180 stores the text received from the voice-text conversion unit 160 in the memory 130 as the search command. The voice-text conversion unit 160 converts the voice signal received from the voice codec unit 150 and the wireless communication unit 140 into text and outputs the voice signal to the controller 180 under the control of the controller 180 in step 206.

The controller 180 identifies information matching the text received from the voice-text conversion unit 160 in the memory 130 in step 207. In step 208, the controller 180 controls the wireless communication unit 140 to send a text (e.g., a name) and identified information (e.g., a telephone number) to the other party and proceeds to step 209. The controller 180 may send the text and the information in the form of a text message, an image, voice, or multimedia. When the information is a telephone number, the controller 180 may set the calling number of the text message as the telephone number. Accordingly, when the user of the other party terminal taps a button, e.g., "send button", the other party terminal attempts a call connection to the telephone number of the received text message.

After the completion of the sending, the controller 180 may control the voice codec unit 150 and the speaker 151 to inform the user that the sending is completed. The controller 180 determines whether a call termination event is generated in step 209. When the call termination event is not detected, the controller 180 returns to step 204. On the other hand, when the call termination event is detected, the process is terminated.

Figure 3:
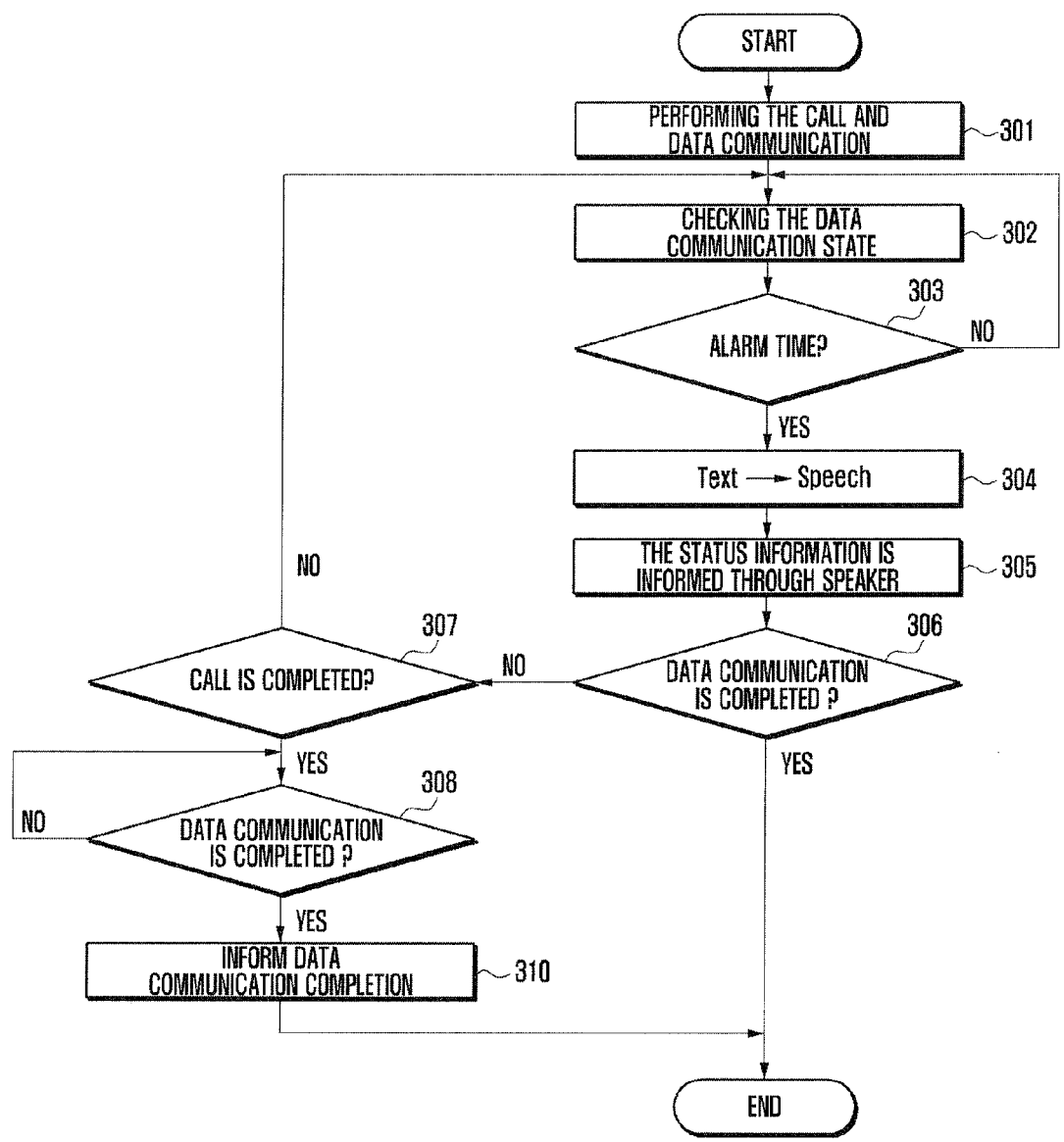
FIG. 3 is a flowchart illustrating a method of providing information according to another exemplary embodiment of the present invention.

FIG. 3 is a flowchart illustrating a method of providing information according to another exemplary embodiment of the present invention.

Referring to FIG. 3, the controller 180 performs the call and data communication in step 301. The controller 180 determines the data communication state, e.g., a remaining download time, a remaining upload time, a remaining download size, a remaining upload size, and a remaining file number in step 302.

The controller 180 periodically guides data communication state by voice. The controller 180 determines whether a triggering event has occurred in step 303. If the triggering event has not occurred, the controller 180 returns to step 302. If the triggering event has occurred, e.g., when the remaining download size is 5 MB, the controller 180 proceeds to step 304 and step 305. The controller 180 controls the voice-text conversion unit 160 to convert status information of data communication into a voice signal in step 304.

The controller 180 controls the wireless communication unit 140, the voice codec unit 150, and the speaker 151, so that the status information of data communication is presented to the user or the other party by voice in step 305. The controller 180 outputs the status information of data communication to the voice-text conversion unit 160. Accordingly, the voice-text conversion unit 160 converts the status information received from the controller 180 into a voice signal and sends it to the voice codec unit 150. The voice codec unit 150 converts the status information converted into the voice signal and outputs the voice signal to the speaker 151. In addition, the voice-text conversion unit 160 may send the status information converted into the voice signal to the wireless communication unit 140 under the control of the controller 180. The controller 180 controls the wireless communication unit 140 to send the status information to the other party terminal when data communication as well as call to the other party terminal is performed. Accordingly, both the user and the other party may be informed of the status information.

The controller 180 determines whether data communication is completed in step 306. When data communication is completed, the process is terminated. When data communication is not completed, the controller 180 determines whether the call is completed in step 307. When the call is not completed, the controller 180 returns to step 302. When the call is completed, the controller 180 proceeds to step 308. When data communication is completed, the controller 180 controls the wireless communication unit 140, the voice codec unit 150, the speaker 151, and the voice-text conversion unit 160, so that the user and the other party are informed that data communication is completed, and terminates the process in step 310. The wireless communication unit 140 may send a text message including data communication completion information to the other party terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing information of a mobile communication terminal, the method comprising:
    determining whether a search command event has been generated during a call with a counterpart terminal;
    converting a voice signal received from the mobile communication terminal or received from the counterpart terminal into text when the search command event is determined to have been generated;
    identifying information matching the text in a memory;
    sending the information to the counterpart terminal; and
    informing, via the mobile communication terminal, in response to a predetermined triggering event occurrence, status information of a data transfer of data when the mobile communication terminal sends the data through a wireless communicator, the status information indicating a progress of the data transfer of the data during the transfer of the data,
    wherein the predetermined triggering event occurs after the call is connected.

2. The method of claim 1, wherein the sending of the information comprises sending the information to the counterpart terminal as at least one of a text message, an image, voice, and multimedia.

3. The method of claim 2, wherein, when the information comprises a telephone number and the information is sent as the text message, the sending of the information further comprises setting a calling number of the text message as the telephone number.

4. The method of claim 1, wherein the informing of the status information comprises:
    converting the status information of the data transfer into a voice signal when the predetermined triggering event occurs; and
    outputting the converted status information of the data transfer to a speaker.

5. The method of claim 4, wherein the informing of the status information further comprises:
    sending the converted status information of the data transfer to the counterpart terminal, when sending the data with the counterpart terminal.

6. The method of claim 1, wherein the determining of whether the search command event has been generated comprises:
    converting the voice signal received from the mobile communication terminal or received from the counterpart terminal into the text;
    determining whether the text is a pre-stored search command; and
    outputting an answer sound to a speaker when the text is determined to be the pre-stored search command.

7. The method of claim 6, further comprising converting the voice signal received from the mobile communication terminal or received from the counterpart terminal into the text and storing the text as the pre-stored search command, when the search command event is determined to have been generated.

8. The method of claim 1, wherein the determining of whether the search command event has been generated comprises:
    receiving a user input event from an input unit;

determining whether the user input event is the search command event; and outputting an answer sound to a speaker when the user input event is determined to be the search command event.

9. The method of claim 1, further comprising informing a completion of the sending of the data through a speaker, when the sending of the data is completed.

10. The method of claim 1, wherein the predetermined triggering event is based on a remaining download size.

11. A mobile communication terminal comprising:
a wireless communicator configured to perform audio and data communication;
a voice codec configured to convert an analog voice signal received from a microphone into a digital voice signal;
a voice-text converter configured to convert the digital voice signal received from the voice codec or received from a counterpart terminal into text; and
at least one processor configured to:
identify information matching the text received from the voice-text converter in a memory,
control the wireless communicator to send the information to a counterpart terminal, when a search command event is generated during a call with the counterpart terminal, and
inform, via the mobile communication terminal, in response to a predetermined triggering event occurrence, status information of a data transfer of data, when the wireless communicator sends the data, the status information indicating a progress of the data transfer of the data during the transfer of the data,
wherein the predetermined triggering event occurs after the call is connected.

12. The mobile communication terminal of claim 11, wherein the at least one processor is further configured to control the wireless communicator to send the information to the counterpart terminal as at least one of a text message, an image, voice, and multimedia.

13. The mobile communication terminal of claim 11, wherein the at least one processor is further configured to set a calling number of a text message as a telephone number, when the information is the telephone number.

14. The mobile communication terminal of claim 11,
wherein the voice-text converter is further configured to convert the status information of the data transfer into a digital voice signal and to output the digital voice signal to the voice codec, and
wherein the voice codec is further configured to convert the digital voice signal received from the voice-text converter into an analog voice signal for outputting to a speaker.

15. The mobile communication terminal of claim 11, wherein the at least one processor, when the text received from the voice-text converter is determined to be a pre-stored search command, is further configured to:
control the voice codec to output an answer sound to a speaker, and
identify information matching the text in the memory after outputting the answer sound.

16. The mobile communication terminal of claim 11, further comprising:
an input configured to generate the search command event,
wherein the input unit includes a side key configured to generate the search command event.

17. The mobile communication terminal of claim 16, wherein the at least one processor, when receiving the search command event from the input unit, is further configured to:
control the voice codec to output an answer sound to a speaker, and
control the voice-text converter to convert a digital voice signal into text.

* * * * *